Patented Apr. 28, 1942

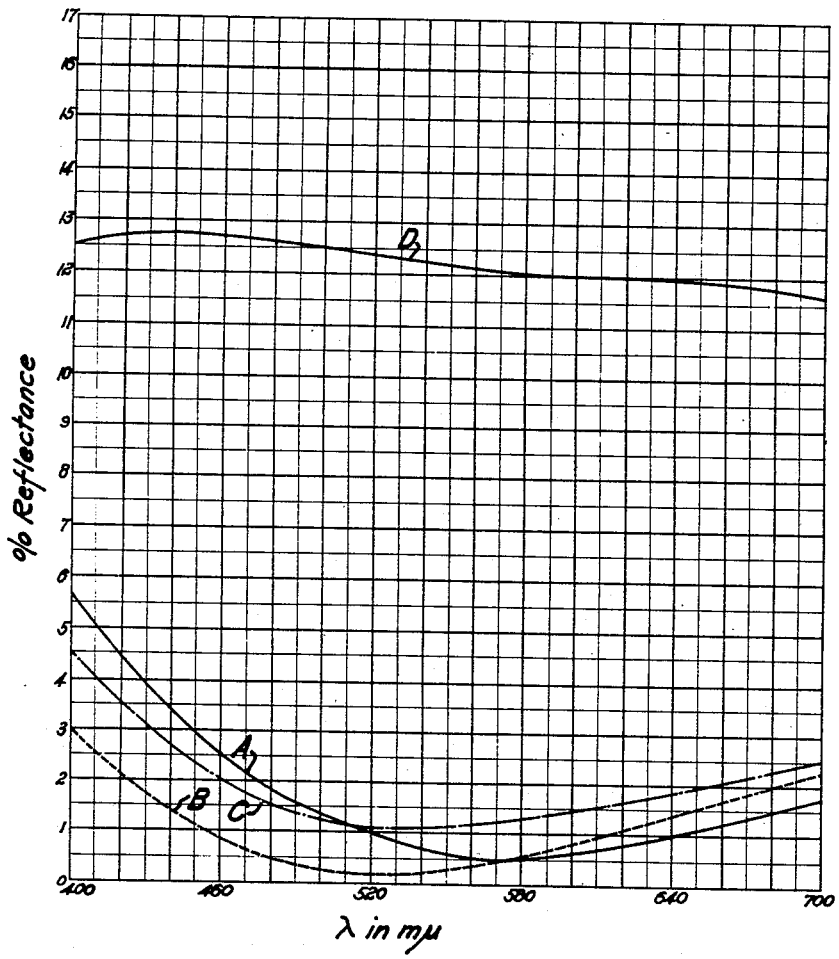

2,281,475

UNITED STATES PATENT OFFICE 2,281,475

REDUCING REFLECTION OF LIGHT FROM SURFACES, AND ARTICLES SO PRODUCED

Charles Hawley Cartwright, San Gabriel, Calif., and Arthur Francis Turner, Newton, Mass., assignors to Research Corporation, New York, N. Y., a corporation of New York Application August 4, 1939, Serial No. 288,458

6 Claims. (Cl. 88—1)

This invention relates to the art of materially diminishing the reflection of light from surfaces, and is concerned more particularly with the treatment of a surface of a light-transmitting article (e. g., a plate made of glass, a lens, a prism, or the like) whereby substantially to eliminate, or at least very materially reduce, the reflection of light from such surface. The invention is concerned also with improved light-transmitting articles which have been treated in accordance with the process hereinafter disclosed and claimed.

In our co-pending application entitled "Process of decreasing reflection of light from surfaces and articles so produced," Serial No. 247,974, filed December 27, 1938, there is described a method of reducing the reflection of light from the surface of an optical element which comprises applying to the surface a layer of a suitable substance having an effective index of refraction intermediate the index of refraction of the optical element and the index of refraction of air and having an optical thickness approximately $x/4$ of the wave length of preselected light, $x$ being a positive odd integer not greater than 9 and preferably being 1. It was there disclosed that a film of lithium fluoride, sodium fluoride, sodium aluminum fluoride, calcium fluoride, or the like, of the appropriate optical thickness and appropriate index of refraction, on a surface of a glass article very greatly diminishes light reflection from said surface.

It has been observed that with age these films become harder and more resistant to abrasion without appreciable alteration in the effectiveness of their diminution of reflection. This hardening effect is exhibited to a marked degree in the case of films of magnesium fluoride, such films becoming noticeably harder in the course of two weeks' aging at normal temperatures.

It has been found desirable to bake the clean surface to be treated at an elevated temperature of 400° to 450° C. for perhaps an hour to improve the tenacity of the film to the glass and also the ruggedness of the film itself.

We have now found that the ruggedness of such films may be improved very materially by subjecting the filmed article to an appropriate baking treatment. Thus, we have found that if we subject a glass plate, carrying on a surface thereof a metal fluoride film or an alkali metal fluosilicate film (of the above defined characteristics), e. g., a magnesium fluoride film, a calcium fluoride film, a potassium fluosilicate film, a sodium fluosilicate film, or the like, to heating at elevated temperature,—e. g., to baking at a temperature of from about 350° to about 500° C.,—for some time, e. g., for a period of time of the order of from several minutes to about an hour and a half or more, the film is rendered desirably tenacious and rugged.

That is to say, the so-baked filmed surface is not disturbed by cleansing with water and soap and may be so rugged that it cannot be scratched with the finger-nail. The baking treatment does not appreciably alter the reflection-diminishing property of the film. $MgF_2$ baked for seven hours at 365° C. was equally improved.

Illustrative examples of the principles of the present invention are the following:

Example I

The starting material was a glass plate carrying on its surfaces films of magnesium fluoride applied as described in our application Serial No. 247,974. The index of refraction of the glass was 1.52; the effective index of refraction of the magnesium fluoride film was 1.37. Each film had an optical thickness of approximately 1400 A. The filmed glass plate exhibited for the two surfaces 2.2% reflection of monochromatic light having a wave length of 5500 A (as compared with 8% for untreated glass) and substantially reduced reflection throughout the visible spectrum.

The filmed plate was placed in an electric oven, and the oven was brought up to 420° C. within a period of 1.5 hours. The oven was then maintained at 420-440° C. for from 1.5 to 2.0 hours, after which the oven was allowed to cool (cooling roughly 3.0 hours). As a result of the baking treatment the magnesium fluoride film was so indurated and "welded" to the glass that it could not be scratched with the finger-nail and could be scrubbed with soap and water without the surface being injured. After baking, the films each had an effective optical thickness of 1150 A. The baked product showed a reflectivity of 1.8% at 4600 A, and a reflectivity of 2.2% at 5500 A; throughout substantially the whole visible spectrum the reflectivity was reduced. The net effect of the baking treatment in this specific example, from the reflectance standpoint, was an appreciable improvement in diminution of reflection. Percent reflectance values ranged as follows: at 4000 A, 2%; at 4500 A, 1.8%; at 5000 A, 1.9%; at 5500 A, 2.2%; at 6000 A, 2.7%; at 6500 A, 3.1%; and at 7000 A, 3.5%.

Example II

In this example we in general duplicated the conditions described in Example I with the exception that the article consisting of a flint glass plate having a refractive index of 1.69 and carrying magnesium fluoride films on its surfaces was baked at 400° C. for 35 minutes. The films, before the baking, had optical thicknesses of approximately 1400 Å each.

The so-baked magnesium fluoride films were very materially more rugged than they were prior to the baking; they could be washed with soap and water without injury to their surfaces, and resisted scratching with the finger-nail.

Thereafter the baked article was washed with a solution of stearic acid in benzene (1 part by weight of stearic acid in 1000 parts by weight of benzene), washed with pure benzene and dried. This subsequent treatment of the baked films was found to enhance the water-resistance of the films, making the latter unaffected by water; the subsequent treatment did not adversely affect the ruggedness of the baked magnesium fluoride films.

The effects of the above specifically described baking and subsequent treatments (Example II) on the reflectance of the magnesium fluoride filmed glass plate are illustrated in the accompanying drawing, the single figure of which is a curve diagram, in which curve A represents the percent reflectance of the filmed plate before the baking treatment, curve B represents the percent reflectance of the filmed plate after the baking treatment, curve C represents the percent reflectance of the filmed plate after the baking and subsequent washing with stearic acid solution, and curve D represents the percent reflectance of the untreated glass plate (i. e., of the glass plate before being provided with the magnesium fluoride films over its surface). It will be seen that the net effect of the baking treatment, from the reflectance standpoint, was an appreciable improvement in diminution of reflection.

We have found that substantially the same improvements in ruggedness and resistivity to abrasion may be gained by baking the films-bearing article at a somewhat lower temperature but for a correspondingly increased period. Thus, a seven hour baking of the magnesium fluoride films at 365° C. appeared to result in a hardening effect equal to that produced by baking at 420–440° C. for 1.5 hours.

This baking treatment was found to have similar ruggedness-imparting effects on cryolite-filmed glass. In the case of the cryolite film, the coating of the baked product, after repeated washings with water and soap, showed some slight blemish but was, nevertheless, materially more rugged and resistant to abrasion than a similar but unbaked cryolite film. The same baking treatment, applied to a glass plate carrying a film of calcium fluoride, was found to yield a product about as rugged as the above-described baked magnesium fluoride film.

It was observed that by baking a LiF film at about 550° C. the film, while fully adherent, was "milky" in appearance and gave a diffused effect.

As was suggested above, films, of appropriate optical thickness, of sodium fluosilicate or potassium fluosilicate, are particularly advantageous for the provision of optical elements of reduced light reflection. These salts have very low indices of refraction—in the neighborhood of 1.29 to 1.30. Moreover, the potassium fluosilicate, because of its low solubility in water, is a very desirable coating material. Films of either of these substances may be improved in ruggedness by the baking treatment of the present invention.

Minimum and maximum baking temperatures and times for all operable coating materials may be determined in accordance with the foregoing description.

This application contains subject-matter in common with our application Serial No. 247,974, filed December 27, 1938.

We claim:

1. Process of improving the ruggedness and tenacity of a reflectance-diminishing light-transmitting layer of solid and stable metallic fluoride on a surface of a solid light-transmitting article, said layer having an optical thickness approximately one-fourth the wavelength of pre-selected light and an effective index of refraction approaching the square root of that of the article, which comprises baking the layer on the article at a temperature between about 300° and about 500° C. at which the optical properties of the layer and of the article are substantially maintained and for a period of time sufficient to effect a substantial improvement in the ruggedness and tenacity of said layer.

2. Process of improving the ruggedness and tenacity of a reflectance-diminishing light-transmitting layer of magnesium fluoride on a surface of a solid light-transmitting article, said layer having an optical thickness approximately one-fourth the wavelength of preselected light and an effective index of refraction approaching the square root of that of the article, which comprises baking the layer on the article at a temperature between about 300° and about 500° C. at which the optical properties of the layer and of the article are substantially maintained and for a period of time sufficient to effect a substantial improvement in the ruggedness and tenacity of said layer.

3. Process of improving the ruggedness and tenacity of a reflectance-diminishing light-transmitting layer of cryolite on a surface of a solid light-transmitting article, said layer having an optical thickness approximately one-fourth the wavelength of preselected light and an effective index of refraction approaching the square root of that of the article, which comprises baking the layer on the article at a temperature between about 300° and about 500° C. at which the optical properties of the layer and of the article are substantially maintained and for a period of time sufficient to effect a substantial improvement in the ruggedness and tenacity of said layer.

4. Process of improving the ruggedness and tenacity of a reflectance-diminishing light-transmitting layer of alkali metal fluosilicate on a surface of a solid light-transmitting article, said layer having an optical thickness approximately one-fourth the wavelength of preselected light and an effective index of refraction approaching the square root of that of the article, which comprises baking the layer on the article at a temperature between about 300° and about 500° C. at which the optical properties of the layer and of the article are substantially maintained and for a period of time sufficient to effect a substantial improvement in the ruggedness and tenacity of said layer.

5. Process of improving the ruggedness and tenacity of a reflectance-diminishing light-transmitting layer of potassium fluosilicate on a surface of a solid light-transmitting article, said layer having an optical thickness approximately one-fourth the wavelength of preselected light and an effective index of refraction approaching the square root of that of the article, which comprises baking the layer on the article at a temperature between about 300° and about 500° C. at which the optical properties of the layer and of the article are substantially maintained and for a period of time sufficient to effect a substantial improvement in the ruggedness and tenacity of said layer.

6. An article comprising a solid light-transmitting body portion and on a normally partially light-reflective surface of said body portion a baked-on coating consisting of a light-transmitting layer of a solid and stable metallic fluoride having an index of refraction approaching the square root of that of the material constituting said body portion and an optical thickness approximately one-fourth the wavelength of said light, said layer functioning materially to reduce reflection of light from said surface, the product being characterized by such ruggedness of the metallic fluoride layer and such adherence of said layer to the article's surface, produced by subjecting the coated article to a baking treatment at a temperature between about 300° and about 500° C., that the layer-coated surface withstands cleansing with water and soap without material blemish to said layer.

CHARLES HAWLEY CARTWRIGHT.
ARTHUR FRANCIS TURNER.